United States Patent
James

(10) Patent No.: US 8,037,900 B2
(45) Date of Patent: Oct. 18, 2011

(54) BI-DIRECTIONAL ADJUSTABLE ENERGY DISSIPATING NEAR ZERO LEAKAGE HEAD LOSS VALVE

(76) Inventor: Bruce James, Oakville (CA)

(*) Notice: Subject to any disclaimer, the term of this patent is extended or adjusted under 35 U.S.C. 154(b) by 1010 days.

(21) Appl. No.: 11/923,147

(22) Filed: Oct. 24, 2007

(65) Prior Publication Data

US 2009/0065080 A1 Mar. 12, 2009

(51) Int. Cl.
*F16K 3/14* (2006.01)
(52) U.S. Cl. .................. 137/625.33; 251/176
(58) Field of Classification Search ............ 137/625.3, 137/625.33; 251/176, 193
See application file for complete search history.

(56) References Cited

U.S. PATENT DOCUMENTS

| | | | |
|---|---|---|---|
| 2,601,231 A | 6/1952 | Smith et al. | |
| 2,827,260 A * | 3/1958 | Jordan | 251/326 |
| 3,183,926 A * | 5/1965 | Boudot | 137/270 |
| 3,312,241 A | 4/1967 | Bryant | |
| 3,463,447 A * | 8/1969 | Ripert | 251/158 |
| 3,517,697 A * | 6/1970 | Holzschuh et al. | 137/625.33 |
| 3,955,591 A | 5/1976 | Baumann | |
| 4,150,693 A * | 4/1979 | Genevey et al. | 137/625.3 |
| 4,489,756 A * | 12/1984 | Balz | 137/625.33 |
| 4,643,226 A * | 2/1987 | Balz | 137/625.33 |
| 4,972,878 A | 11/1990 | Carlin | |
| 6,776,388 B2 * | 8/2004 | Baumann | 251/61.4 |
| 6,886,595 B2 | 5/2005 | James et al. | |
| 2006/0197047 A1 | 9/2006 | Batcher et al. | |

* cited by examiner

*Primary Examiner* — John Fox
(74) *Attorney, Agent, or Firm* — Phillips Lytle LLP

(57) ABSTRACT

A bi-directional adjustable energy dissipating near zero leakage head loss valve comprising a valve body including and actuation shaft housing and a guide shaft mount disposed in opposition along the transverse valve actuation axis; a fixed plate having downstream orifices parallel to the flow axis; a mobile plate having upstream orifices parallel to the flow axis adapted to move along the transverse valve actuation axis: from a fully open position, wherein the upstream and downstream orifices are aligned to allow flow communication to a fully closed position, wherein the orifices are blocked by the mobile plate; a self adjusting taper ring located about the upstream inner perimeter of the valve body, the self adjusting taper ring having an inner surface engagingly biased against and parallel to the upstream side of the mobile plate, and having an outer surface engagingly biased against an upstream pipe gasket flange.

29 Claims, 5 Drawing Sheets

BI-DIRECTIONAL ADJUSTABLE ENERGY DISSIPATING NEAR ZERO LEAKAGE HEAD LOSS VALVE

This application claims the benefit of Canadian Patent Application No. 2,600,913, filed on Sep. 7, 2007.

FIELD OF INVENTION

The invention relates to a bi-directional adjustable energy dissipating near zero leakage head loss valve, with a fixed plate, mobile plate, and a self adjusting taper ring with elastomer seals. The mobile plate is supported during reverse flow and transient conditions by the taper ring and a lower guide shaft.

BACKGROUND OF THE ART

The invention relates to valves for installation on liquid inflow pipelines known as adjustable energy dissipating or head loss valves with near zero leakage. The valves to which my invention relates include a fixed plate, an adjustable or mobile plate and a self adjusting taper ring, secured within the valve body between upstream and downstream flanges in the inflow pipeline of various fixed diameters. Further, the valves are suitable for horizontal and vertical mounting orientation in horizontal or vertical pipelines. An example of prior art head loss valve is shown by my related Canadian Patent No. 2,435,724. In this prior art, a simple annular valve body permits the clamping of the valve between opposed pipe flanges with axially extending bolts. The fixed plate is downstream of flow in the liquid inflow pipeline, and is perforated with a pattern of axial holes. The adjustable or mobile plate is upstream of flow in the liquid inflow pipeline, and is likewise perforated and retained within the annular valve body for transverse sliding motion, normal to flow, between a fully opened position where perforations in the fixed and mobile plates are aligned, and a fully closed position where the perforations within the fixed plate are blocked by solid portions of the mobile plate. A further example of prior art head loss valve is shown in U.S. Pat. No. 4,150,693 to Genevey et al. In this prior art valve, the mobile perforated plate is moved between the open and closed position with a manual hand wheel whose rotation meshes with a threaded rod that engages the mobile perforated plate to open and close the valve. The mobile perforated plate is guided in its movement by a housing opposite to the threaded rod, which slides in a slot.

A further example of prior art head loss valve is shown in U.S. Patent Application Publication 2006/0197047 to Batcher et al. This prior art describes a tensioning device capable of reducing fluid leakage between unaligned proximate valve plates. A disadvantage of the prior art valve illustrated in U.S. Pat. No. 4,150,693 is that reverse flow or transient flow conditions acting on the mobile plate can dislodge it from its operating position causing damage, misalignment or disabling of the valve. In addition, the mobile plate shown in U.S. Pat. No. 4,150,693 may vibrate creating noise and potential wear or damage over the long term during bi-directional flow conditions, and such valves without a lower guide or shaft, are not suitable for horizontal mounting in a pipeline. Additionally, the cited prior art does not provide for near zero leakage of the type achieved by those with a Class VI rating established by ANSI/FCI 70-2. Further U.S. Patent Application Publication 2006/0197047 does not provide for a self adjusting tensioning device. The tensioning device must be manually regulated with a tension member.

It is an object of the invention to provide improved sealing of the fixed and mobile plates in a self regulating manner during operation to prevent or substantially prevent leakage during normal flow, reversal of flow and bi-directional transient flow conditions.

SUMMARY OF THE INVENTION

The invention provides for a bi-directional head loss valve comprising a valve body having a flow path along a flow axis and a transverse valve actuation axis, the body including an actuation shaft housing and a guide shaft mount disposed in opposition along the transverse valve actuation axis; a fixed plate within the valve body transverse the flow axis, the fixed plate having a plurality of downstream orifices parallel to the flow axis; a mobile plate housed within the valve body upstream of and parallel to the fixed plate, the mobile plate having an upstream side, and a plurality of upstream orifices parallel to the flow axis, the mobile plate being adapted to move along the transverse valve actuation axis normal to the flow axis: from a fully open position, wherein the upstream and downstream orifices are in flow communication within an upstream inner perimeter of the valve body on the upstream side of the mobile plate to a fully closed position, wherein the downstream orifices are blocked by the mobile plate; a self adjusting taper ring located about the upstream inner perimeter of the valve body, the self adjusting taper ring having an inner surface engagingly biased against and parallel to the upstream side of the mobile plate, and having an outer surface engagingly biased against an upstream pipe gasket flange; an actuation shaft along the transverse actuation axis slidably housed within the actuation shaft housing, the actuation shaft having an inner end engaging the mobile plate and an outer end adapted to engage a valve actuator; and a guide shaft along the transverse actuation axis having an inner end engaging the mobile plate and an outer end engaging the guide shaft mount wherein at least one of the guide shaft; mobile plate; and the guide shaft mount include pressure equalization channels in communication with the flow path.

Another aspect of the present invention provides for a bi-directional head loss valve wherein the upstream side of the mobile plate is disposed at an angle that is not normal to the flow axis. This angle is called a harmonized angle.

Another aspect of the present invention provides for a bi-directional head loss valve wherein the self adjusting taper ring comprised of an upstream end, a downstream end and a central core.

A still further aspect of the present invention provides for a bi-directional head loss valve wherein the upstream end and the downstream end of the self adjusting taper ring are composed of a flexible elastomer seal.

A still further aspect of the present invention provides for a bi-directional head loss valve wherein the central core of the self adjusting taper ring is composed of carbon steel.

DETAILED DESCRIPTION OF THE INVENTION

Figure 1:
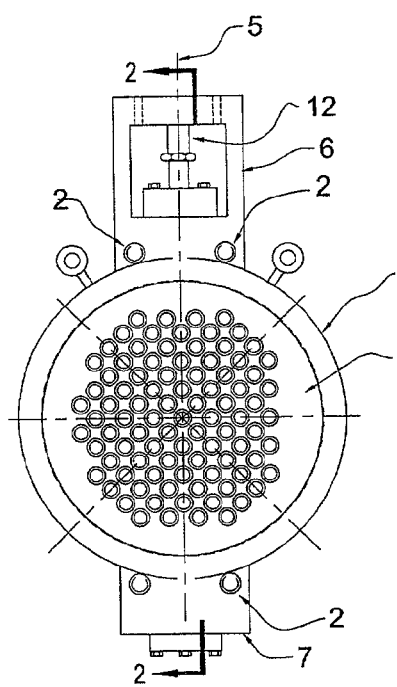
FIG. 1 illustrates a transverse elevation view of a prior art bi-directional head loss valve, taken from the downstream end thereof, as shown in my Canadian Patent No. 2,435,724.
Figure 2:
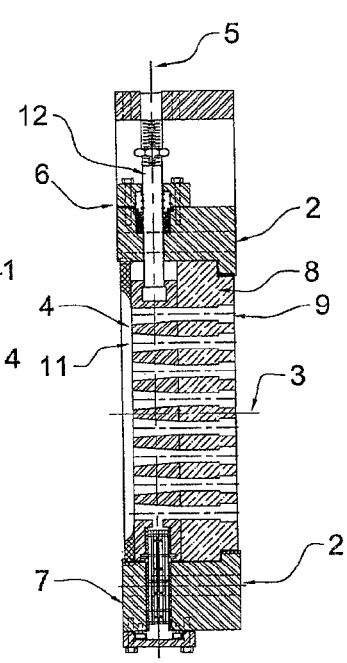
FIG. 2 illustrates an axial cross-sectional view along line 2-2 of FIG. 1.

FIG. 1 shows a transverse elevation view of a bi-directional head loss valve according to the invention, taken from the downstream end thereof as shown in my Canadian Patent No. 2,435,724, whereas FIG. 2 shows an axial cross-sectional view along line 2-2 of FIG. 1. The generally annular valve body 1 has parallel upstream and downstream faces for bolting between flanges of a pipe using threaded bolts through bolt holes 2. In a preferred embodiment of the present invention, the threaded bolts may appear in an asymmetric position so as to ensure that the valve housing may only be installed in one manner. Further, those skilled in the art may appreciate that the threaded bolts may be replaced by other securing means such as a key way mechanism, which is described in more detail later in this specification.

Figure 6:
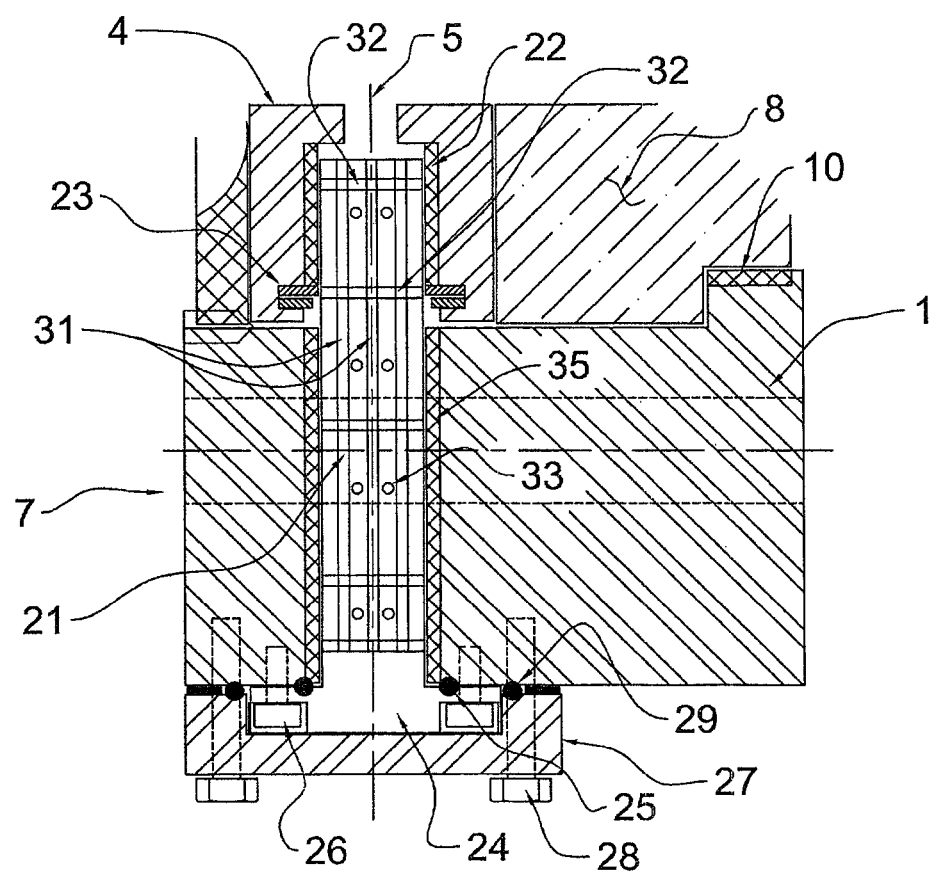
FIG. 6 illustrates a transverse cross-sectional view through the guide shaft mount and guide shaft which supports the bottom position of the mobile plate during vertical motion between the open and closed position.

A valve body 1 defines an axial flow path of generally circular cross-section centred along a flow axis 3. A mobile plate 4 slides within the valve body 1 along the transverse valve actuation axis 5. In the top portion of the valve body 1, as illustrated, is an actuation shaft housing 6 and disposed in opposition along the transverse valve actuation axis 5 is a guide shaft mount 7, which forms part of valve body 1. A fixed plate 8 is mounted within the valve body 1 transverse to the flow axis 3 and includes a large number of downstream orifices 9 that are parallel to the flow axis 3 as best seen in FIG. 2. The fixed plate 8 is isolated from the valve body 1 with an anti-corrosion ring 10 as shown in FIG. 6, to ease removal of the fixed plate 8 during maintenance or inspection. The anti-corrosion ring 10 and other bearings which will be described in detail may be of the non-metallic self-lubricating woven fabric type sold under the trade-mark DURALON™ which includes woven TEFLON™ fabric liners backed by filament wound fibreglass and epoxy resins, or other non-metallic materials.

Figure 3:
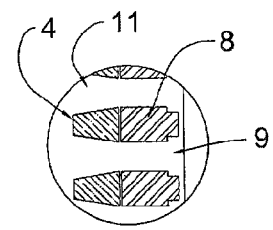
FIG. 3 illustrates a detailed cross-sectional view of the perforations within the mobile plate and the fixed plate in an aligned or open position.
Figure 4:
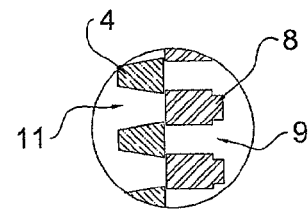
FIG. 4 illustrates a detailed cross-sectional view of the perforations within the mobile plate and the fixed plate in a non-aligned or closed position.

Mobile plate 4 is also housed within the valve body 1 upstream of and parallel to the fixed plate 8. Mobile plate 4 includes an equal number of upstream orifices 11 that are parallel to the flow axis 3. The mobile plate 4 is adapted to move along the transverse valve actuation axis 5 from a fully open position as shown in FIG. 2 and FIG. 3 where the upstream orifices 11 and the downstream orifices 9 are in flow communication and to move to a fully closed position as shown in FIG. 4 where the downstream orifices 9 are blocked by the solid portions of the mobile plate 4. The closed position is achieved by an upward movement of the mobile plate 4 by the actuation shaft 12.

Figure 5:
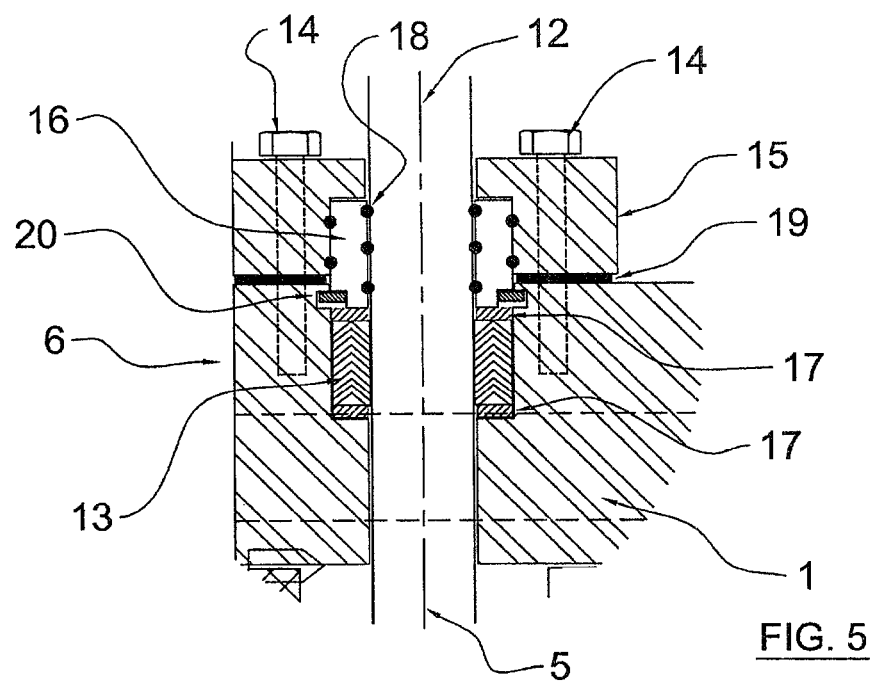
FIG. 5 illustrates a vertical cross-sectional view through the actuation shaft housing showing the sealing packing arrangement.

The actuation shaft 12 is disposed along the transverse actuation axis 5 and slidably housed within the actuation shaft housing 6 sealed with chevron shaped annular packing 13, as best seen in FIG. 5. Bolts 14 secure an annular collar 15 that compresses the packing 13 via sleeve 16 and containment rings 17. O-rings 18 seal between the sleeve 16, the actuation shaft 12 and the collar 15 whereas a gasket 19 seals between the valve body 1 and the collar 15.

An advantage of this arrangement is that O-rings 18 and sleeves 16 as well as collar 15 and gasket 19 can be removed for inspection and maintenance while the valve remains in service. The fluid pressure forces the packing 13 upwardly thereby engaging split ring 20 and containment ring 17. The chevron shape of the packing 13 flexes or pressurizes to maintain a seal with the actuation shaft 12 during such maintenance operation.

The actuation shaft has an inner end that engages the mobile plate 4 and an outer end that is adapted to engage a valve actuator (not shown) with a threaded outer end surface for example. Conventional manual wheels or electrically powered valve actuators can be utilized in a conventional manner.

FIG. 6 shows details of the guide shaft mount 7 for housing the guide shaft 21 along the transverse actuation axis 5. An inner end of the guide shaft 21 engages the mobile plate 4 whereas the outer end of the guide shaft 21 engages the guide shaft mount 7 of the valve body 1. In the preferred embodiment illustrated in the drawings the guide shaft 21 slidably engages the mobile plate 4. Cylindrical DURALON™ bearings 22 reduce friction, isolate different materials from corrosive activity and maintain alignment. The cylindrical bearing 22 is retained between the mobile plate 4 with removable split rings 23. However, it will be apparent to those skilled in the art that the guide shaft 21 could equally be fixed to the mobile plate 4 and slide within the guide shaft mount 7.

Preferably the guide shaft 21 includes an external head 24 sealed to an external surface of the valve body 1 with O-rings 25 and bolts 26. In this embodiment, the guide shaft 21 can extend through the valve body 1 and is easily removed for maintenance purposes. Further, it is preferable to ensure sealing of the valve body 1 with a seal end cap 27 also secured to the external surface of the valve body 1 with bolts 28 and O-ring 29 covering the external head 24 of the guide shaft 21. An isolating sleeve 35 about the guide shaft 21 isolates the guide shaft 21 from the valve body 1 and ensures that corrosion does not lock the guide shaft 21 within the valve body 1. The sleeve 35 may be comprised of a di-electric material and is also a DURALON™ bearing preferably.

In order to prevent undesirable hydraulic locking of the mobile plate 4, hydraulic interference with the guide shaft 21 or to avoid lifting of the mobile plate 4 under high pressure, pressure equalization channels (31, 32, 33) are provided in communication with the flow path in at least one of the guide shafts 21, the mobile plate 4 or the guide shaft mount 7.

In the preferred embodiment shown, the pressure equalization channels include three examples. The first example comprises longitudinal grooves 31 creating splines longitudinally within the exterior surface of the guide shaft 21. Further examples of pressure equalization channels include the radial grooves 32 and bores 33 through the guide shaft 21. Other configurations of pressure equalization channels may include helical grooves (not shown) or other combinations of grooves and bores. The function of the grooves 31 and 32 and the bores 33 is to enable free fluid flow around the guide shaft 21 thereby ensuring that high or low relative pressure zones or negative pressure zones do not occur around the guide shaft 21 or mobile plate 4 that would create undesirable movement of the mobile plate 4 or create hydraulic locking thus impeding operation of the valve.

Figure 7:
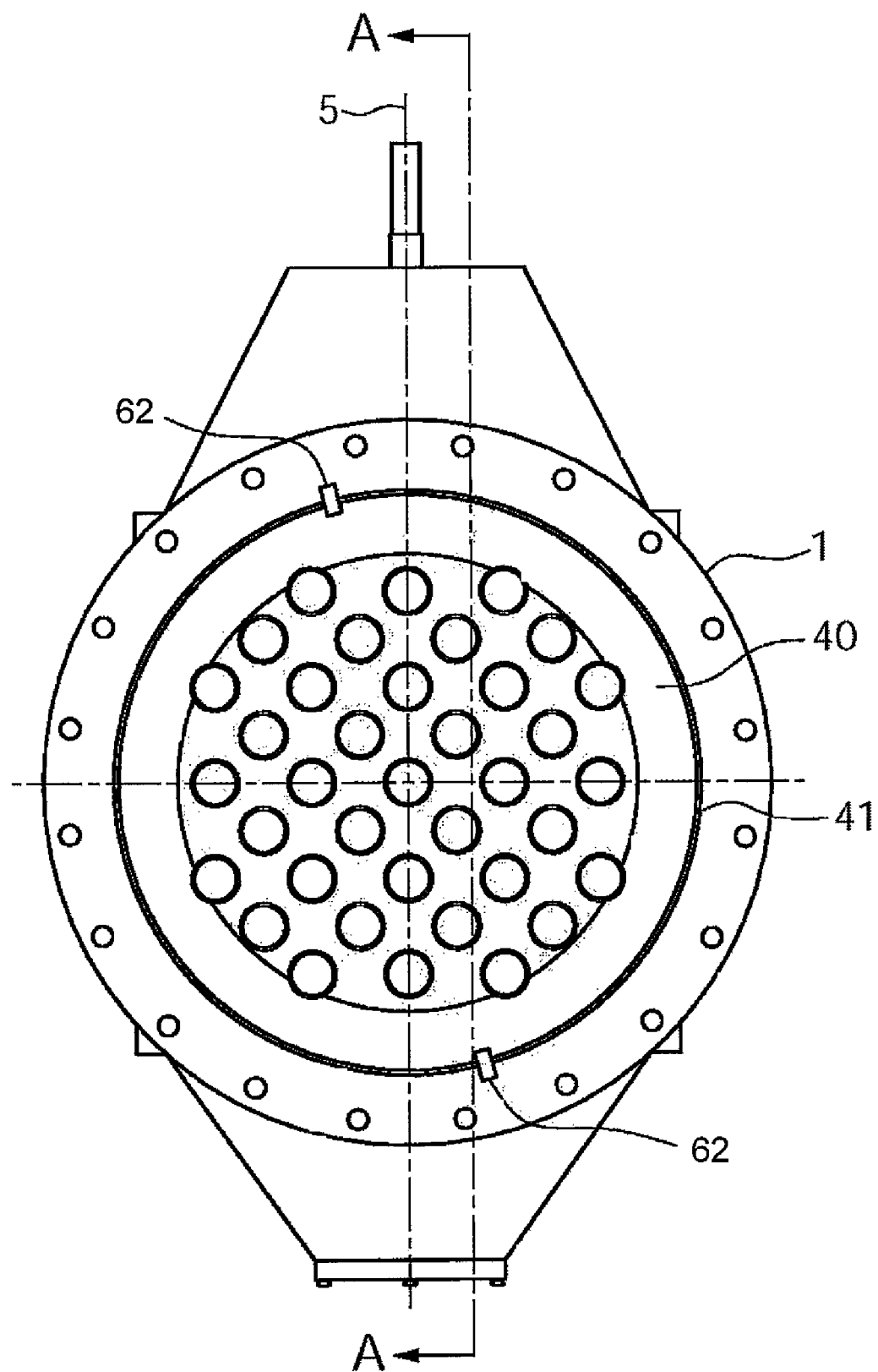
FIG. 7 illustrates a view of the bi-directional head loss valve of the invention, taken from the upstream view thereof.

As shown in FIG. 7, a self adjusting taper ring 40 is associated with mobile plate 4. While described as a taper ring, it should be noted that the self adjusting taper ring 40, may be of any number of shapes and need not necessarily be tapered. Moreover, the self adjusting taper ring 40 need not necessarily be ring shaped and could be square, triangular or rectangular depending up on the shape of inner perimeter 41 of valve body 1. Generally, the shape of the self adjusting taper ring 40 shall approximate the opening as defined by the pipe gasket flange and the mobile plate. In the preferred embodiment, the self adjusting taper ring 40 is described as a ring and is tapered and is located on the upstream face of mobile plate 4 about inner perimeter 41 of valve body 1. The self adjusting taper ring 40 may be secured to the valve body 1 by a securing means 62 such as an asymmetric rotational retaining mechanism (such as a screw), or by an asymmetric key way mechanism in conjunction with the interaction contact of the upstream pipe flange 51. In the preferred embodiment of the present invention, an asymmetric key way mechanism is used as the securing means 62. The asymmetry assures that the valve can only be secured in one manner, that being the proper manner. In addition, the asymmetric key way securing means 62 will further permit the self adjusting taper ring 40, to float in the horizontal plane along the flow axis 3 if the pressure on the valve is great enough, thereby energizing upstream seal 42 and downstream seal 46 through compression. This ability for the self adjusting taper ring 40 to float further assists in dissipating energy and assists in prolonging the lifetime of the invention.

The taper ring 40 is described as being self adjusting due to its ability to energize the upstream and downstream seals 42, 46 in conjunction with its energy dissipating floating ability in response to pressure being applied to the valve in both directions.

Figure 8:
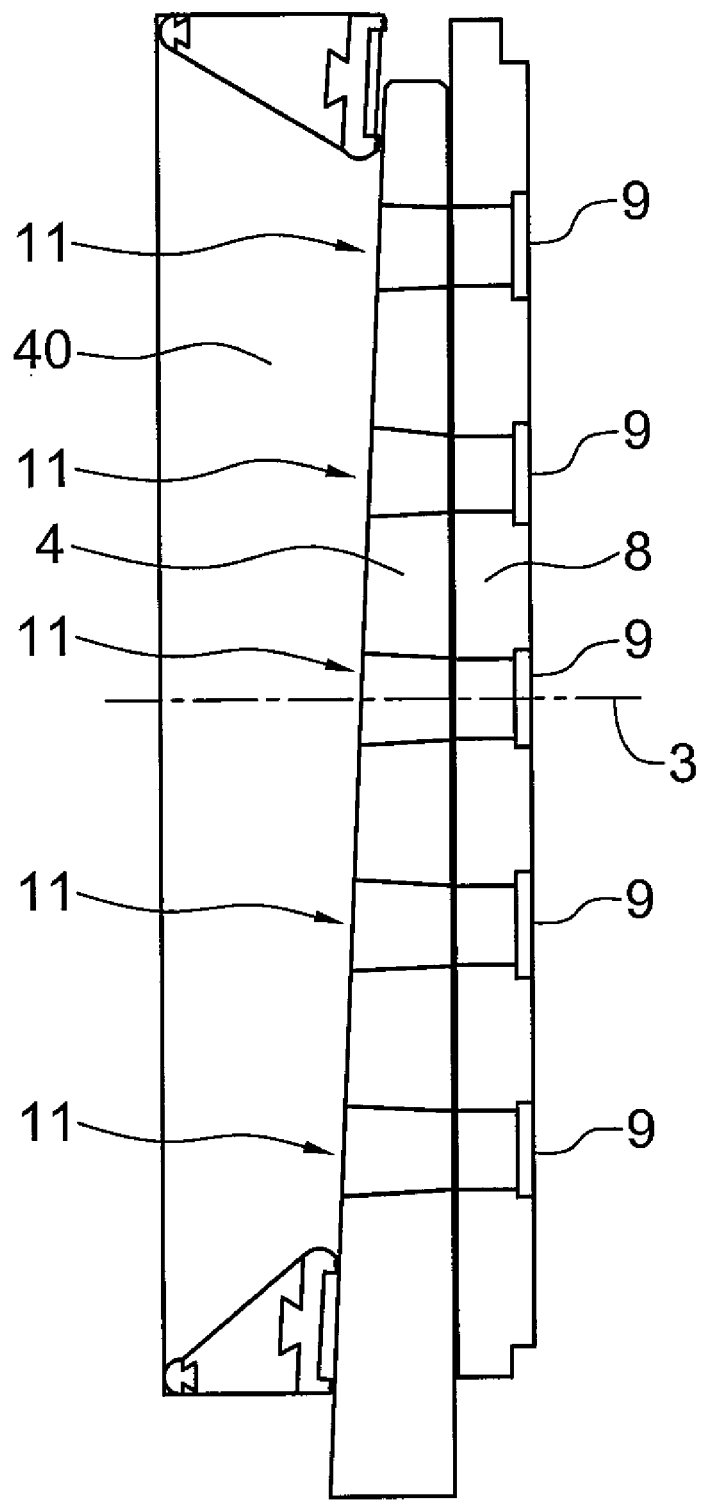
FIG. 8 illustrates an axial cross-sectional view taken along line A-A of FIG. 7 illustrating the self adjusting taper ring, taken from the upstream end of the valve.

FIG. 8 further illustrates the location of the self adjusting taper ring 40 using the axial cross sectional view along line A-A of FIG. 7, and how the self adjusting taper ring 40 engagingly biases the mobile plate 4 all around the inner perimeter 41 of the valve body 1.

Figure 9:
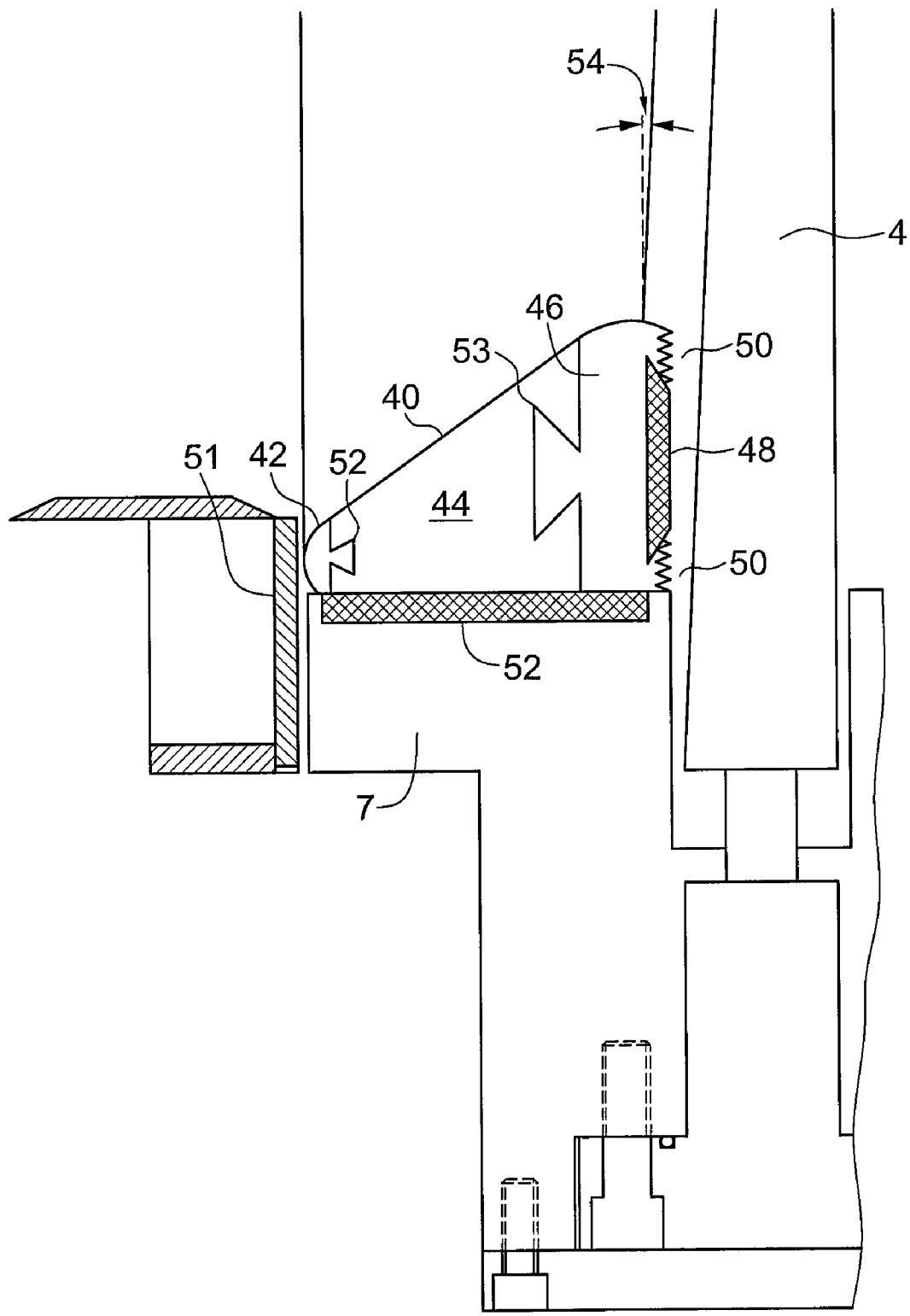
FIG. 9 illustrates a more detailed axial cross-sectional view taken along line A-A of FIG. 7, of the lower half of the self adjusting taper ring.

FIG. 9 illustrates in greater detail the lower cross-sectional view of the self adjusting taper ring 40. As depicted, in its present embodiment, the self adjusting taper ring 40 is comprised of four elements: an upstream seal 42 preferably composed of an elastomer that is engagingly biased against a pipe gasket flange 51, and is energized through compression; a central core element 44 preferably composed of a carbon steel, stainless steel or a ductile iron; downstream seal 46 also preferably composed of an elastomer that is engagingly biased against upstream face of the mobile plate 4 and is energized through compression; downstream seal 46 is further comprised or envelopes a recessed molded ultra high molecular weight polyurethane 48 (UHMWP). In one embodiment of the present invention, the upstream seal 42, and downstream seal 46 may be comprised of, an elastomer seal such as silicone. The inclusion of the elastomer seals 42, 46 further assist in prolonging the lifetime of the invention. The upstream and downstream elastomer seals 42, 46 assist in pressure dissipation in a non corrosive manner, when compressed, and further reduce frictional wear between the elements such as the mobile plate 4 and the self adjusting taper ring 40 itself. The inclusion of the UHMWP 48 further assists the elastomer in supporting pressure dissipation and assists in structural stabilization and structural integrity of the elastomer.

The preferred manner in which the upstream seal 42 and the downstream seal 46 of the self adjusting taper ring are secured to the core element 44 is by a dovetail groove 52 and 53 respectively. However it should be appreciated by those skilled in the art, that the means of securing the upstream seal 42 and the downstream seal 46 of the self adjusting taper ring 40 need not be limited to a dovetail groove.

An additional structural enhancement of the self adjusting taper ring 40, is the inclusion of saw tooth edges 50 on the downstream seal 46 that engagingly bias the upstream side of mobile plate 4. The saw tooth edges 50 are elastic and flexible and therefore assist in minimizing frictional wear between the downstream seal 46 and the upstream side of mobile plate 4, by decreasing the surface area, which in turn further increases the lifetime of the invention. In addition, each of the tips of the elastomeric saw tooth edges 50 present a sealing edge upon contact with the mobile plate 4.

As further exemplified by FIG. 9, the upstream side of the mobile plate 4 is disposed at an angle 54 that is not normal to flow axis 3. Angle 54 is called a harmonized angle. Angle 54 is in the range of 1° to 10° from the normal. The self adjusting taper ring 40 is positioned in such a manner as to mirror the angle of disposition (1 to 10°) as defined by the upstream side of the mobile plate 4. The angled upstream side of the mobile plate 4 further assists the sealing mechanism by permitting the mobile plate 4 to act as a wedge between the self adjusting taper ring 40 and the guide shaft mount 7.

A further enhancement to the present invention is the inclusion of a recessed UHMWP contact strip 52 in the valve body 1 or the guide shaft mount 7. The UHMWP contact strip 52 serves several roles assisting in negating the effect of galvanic corrosion between the metallic central core element 44 of the self adjusting taper ring 40 and the guide shaft mount 7 which in turn inhibits seizure of the valve body 1 during long periods of time in which the valve remains open, or closed, thereby further prolonging the lifetime of the invention. In the preferred embodiment of the present invention, the UHMWP contact strip 52 is recessed from the outer edges of the valve or guide shaft mount 7 in such a manner as to cover the contact area between metallic central core element 44 and the metallic valve body 1 or guide shaft mount 7.

As mentioned, a further advantage of the present invention is its near zero leakage performance. Those skilled in the art will appreciate that ANSI/FCI 70-2 establishes a series of six leakage classes for control valves. The present invention, with the assistance of the self adjusting taper ring 40, along with the harmonized angle of the upstream face of the mobile plate 4 achieves the class VI rating or near zero leakage performance which produces the least amount of leakage.

Although the above description relates to a specific preferred embodiment as presently contemplated by the inventor, it will be understood that the invention in its broad aspect includes mechanical and functional equivalents of the elements described herein.

The invention claimed is:

1. A bi-directional head loss valve comprising:
   a valve body having a flow path along a flow axis and a transverse valve actuation axis, the body including an actuation shaft housing and a guide shaft mount disposed in opposition along the transverse valve actuation axis;
   a fixed plate within the valve body transverse the flow axis, the fixed plate having a plurality of downstream orifices parallel to the flow axis;
   a mobile plate housed within the valve body upstream of and parallel to the fixed plate, the mobile plate having an upstream side, and a plurality of upstream orifices parallel to the flow axis, the mobile plate being adapted to move along the transverse valve actuation axis: from a fully open position, wherein the upstream and downstream orifices are in flow communication within an upstream inner perimeter of the valve body on the upstream side of the mobile plate; to a fully closed position, wherein the downstream orifices are blocked by the mobile plate;

a ring located about the upstream inner perimeter of the valve body, the ring having an inner surface engagingly biased against and parallel to the upstream side of the mobile plate, an outer surface engagingly biased against an upstream pipe gasket flange, an upstream end, a downstream end and a central core, the upstream end and the downstream end of the ring composed of an elastomer seal;

an actuation shaft along the transverse valve actuation axis slidably housed within the actuation shaft housing, the actuation shaft having an inner end engaging the mobile plate and an outer end adapted to engage a valve actuator; and a guide shaft along the transverse valve actuation axis having an inner end engaging the mobile plate and an outer end engaging the guide shaft mount.

2. A bi-directional head loss valve according to claim 1 wherein the guide shaft slidably engages the mobile plate.

3. A bi-directional head loss valve according to claim 2 wherein the guide shaft extends through the valve body, the guide shaft including an external head sealed to an external surface of the valve body.

4. A bi-directional head loss valve according to claim 3 wherein the external head of guide shaft is secured to the valve body with bolts and is sealed with an O-ring.

5. A bi-directional head loss valve according to claim 4 comprising a sealed end cap secured to the external surface of the valve body covering the external head of the guide shaft.

6. A bi-directional head loss valve according to claim 1 comprising a slide bearing about the guide shaft.

7. A bi-directional head loss valve according to claim 1 comprising an isolating sleeve about the guide shaft.

8. A bi-directional head loss valve according to claim 7, wherein the isolating sleeve is comprised of a di-electric material.

9. A bi-directional head loss valve according to claim 1 wherein the elastomer seal is composed of silicone.

10. A bi-directional head loss valve according to claim 1 wherein the upstream end and the downstream end elastomer seals of the ring are held to the central core of the ring by a dovetail groove.

11. A bi-directional head loss valve according to claim 1 wherein the downstream end elastomer seal engagingly biases against the upstream side of the mobile plate.

12. A bi-directional head loss valve according to claim 11 wherein the downstream end elastomer seal incorporates a saw tooth edge that engagingly biases against the upstream side of the mobile plate.

13. A bi-directional head loss valve according to claim 1 wherein the downstream end elastomer seal is comprised of a recessed molded ultra high molecular weight polyurethane that engagingly biases against the upstream side of the mobile plate.

14. A bi-directional head loss valve according to claim 1 wherein the central core of the ring is comprised of carbon steel.

15. A bi-directional head loss valve according to claim 1 wherein the central core of the ring is comprised of iron.

16. A bi-directional head loss valve according to claim 1 wherein the central core of the ring is comprised of stainless steel.

17. A bi-directional head loss valve according to claim 1 wherein the upstream side of the mobile plate is parallel to the downstream end of the ring.

18. A bi-directional head loss valve according to claim 1 wherein the ring is fixedly secured to the valve body.

19. A bi-directional head loss valve according to claim 18 wherein the ring is secured to the valve body by a rotational retaining mechanism.

20. A bi-directional head loss valve according to claim 19 wherein the rotational retaining mechanism is a screw.

21. A bi-directional head loss valve according to claim 1 wherein the ring is tapered in appearance.

22. A bi-directional head loss valve according to claim 1 wherein the ring is not tapered in appearance.

23. A bi-directional head loss valve according to claim 1 wherein the ring self adjusts due to the pressure received by the mobile plate.

24. The bi-directional head loss valve according to claim 1 wherein at least one of the guide shaft, the mobile plate and the guide shaft mount include a pressure equalization channel in communication with the flow path.

25. The bi-directional head loss valve according to claim 24 wherein the pressure equalization channel comprises at least one groove in an external surface of the guide shaft.

26. The bi-directional head loss valve according to claim 25, wherein the groove has an orientation selected from a group consisting of longitudinal, radial and helical.

27. The bi-directional head loss valve according to claim 24, wherein the pressure equalization channel comprises a bore through the guide shaft.

28. A bi-directional head loss valve comprising:
a valve body having a flow path along a flow axis and a transverse valve actuation axis, the body including an actuation shaft housing and a guide shaft mount disposed in opposition along the transverse valve actuation axis;

a fixed plate within the valve body transverse the flow axis, the fixed plate having a plurality of downstream orifices parallel to the flow axis;

a mobile plate housed within the valve body upstream of and parallel to the fixed plate, the mobile plate having an upstream side, and a plurality of upstream orifices parallel to the flow axis, the mobile plate being adapted to move along the transverse valve actuation axis: from a fully open position, wherein the upstream and downstream orifices are in flow communication within an upstream inner perimeter of the valve body on the upstream side of the mobile plate; to a fully closed position, wherein the downstream orifices are blocked by the mobile plate;

a ring located about the upstream inner perimeter of the valve body, the ring having an inner surface engagingly biased against and parallel to the upstream side of the mobile plate, and having an outer surface engagingly biased against an upstream pipe gasket flange;

an actuation shaft along the transverse valve actuation axis slidably housed within the actuation shaft housing, the actuation shaft having an inner end engaging the mobile plate and an outer end adapted to engage a valve actuator; and a guide shaft along the transverse valve actuation axis having an inner end engaging the mobile plate and an outer end engaging the guide shaft mount;

wherein the valve body further comprises a recessed molded ultra high molecular weight polyurethane that engagingly biases the ring.

29. A bi-directional head loss valve comprising:

a valve body having a flow path along a flow axis, and a transverse valve actuation axis, the body including an actuation shaft housing and a guide shaft mount disposed in opposition along the transverse valve actuation axis;

a fixed plate within the valve body transverse the flow axis, the fixed plate having a plurality of downstream orifices parallel to the flow axis;

a mobile plate housed within the valve body upstream of and parallel to the fixed plate, the mobile plate having an upstream side, and a plurality of upstream orifices parallel to the flow axis, the mobile plate being adapted to move along the transverse valve actuation axis: from a fully open position, wherein the upstream and downstream orifices are in flow communication within an upstream inner perimeter of the valve body on the upstream side of the mobile plate; to a fully closed position, wherein the downstream orifices are blocked by the mobile plate;

a ring located about the upstream inner perimeter of the valve body, the ring having an inner surface engagingly biased against and parallel to the upstream side of the mobile plate, and having an outer surface engagingly biased against an upstream pipe gasket flange;

an actuation shaft along the transverse valve actuation axis slidably housed within the actuation shaft housing, the actuation shaft having an inner end engaging the mobile plate and an outer end adapted to engage a valve actuator; and a guide shaft along the transverse valve actuation axis having an inner end engaging the mobile plate and an outer end engaging the guide shaft mount;

wherein the ring is movably secured to the valve body in a direction parallel to the flow axis and the ring is secured to the valve body by a key way mechanism.

\* \* \* \* \*